US011949472B2

(12) United States Patent
Fryking et al.

(10) Patent No.: US 11,949,472 B2
(45) Date of Patent: Apr. 2, 2024

(54) MU-MIMO OPERATION CONTROL

(71) Applicant: Telefonaktiebolaget LM Ericsson (publ), Stockholm (SE)

(72) Inventors: Per Fryking, Lund (SE); Jianmin Hou, Lund (SE); Harish Venkatraman Bhat, Hjärup (SE); Vanessa Fakhoury, Amsterdam (NL); Xin Zhou, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/616,775

(22) PCT Filed: Jun. 5, 2019

(86) PCT No.: PCT/EP2019/064564
§ 371 (c)(1),
(2) Date: Dec. 6, 2021

(87) PCT Pub. No.: WO2020/244746
PCT Pub. Date: Dec. 10, 2020

(65) Prior Publication Data
US 2022/0311482 A1    Sep. 29, 2022

(51) Int. Cl.
*H04B 7/0452* (2017.01)
*H04L 5/00* (2006.01)
*H04W 4/02* (2018.01)

(52) U.S. Cl.
CPC ......... *H04B 7/0452* (2013.01); *H04L 5/0023* (2013.01); *H04L 5/0048* (2013.01); *H04L 5/0058* (2013.01); *H04W 4/027* (2013.01)

(58) Field of Classification Search
CPC ... H04L 5/0048; H04L 5/0023; H04L 5/0058; H04L 5/0051; H04B 7/0452; H04B 7/0695; H04W 4/027
See application file for complete search history.

(56) References Cited

U.S. PATENT DOCUMENTS 9,609,468 B1    3/2017  Moscovich et al.
2012/0270535 A1  10/2012  Chen et al.
(Continued)

FOREIGN PATENT DOCUMENTS

CN    108242948 A    7/2018
CN    108260158 A    7/2018
(Continued)

OTHER PUBLICATIONS

Hong Zhang and Ali Abdi, "Mobile Speed Estimation Using Diversity Combining in Fading Channels", New Jersey Institute of Technology, IEEE Communications Society, 2004 (Year: 2004).*
(Continued)

*Primary Examiner* — Aristocratis Fotakis
(74) *Attorney, Agent, or Firm* — Withrow & Terranova, PLLC

(57) ABSTRACT

A method is disclosed for multi-user multiple-input multiple-output (MU-MIMO) operation of an access node serving a plurality of user devices. The method comprises acquiring a speed category for a user device of the plurality of user devices and controlling the MU-MIMO operation in relation to the user device based on the speed category. In some embodiments, controlling the MU-MIMO operation in relation to the user device based on the speed category comprises one or more of: controlling reference signal transmission for the user device based on the speed category and controlling MU-MIMO group affiliation of the user device based on the speed category. In some embodiments, controlling reference signal transmission for the user device based on the speed category comprises controlling a duration of a time interval between subsequent reference signal transmissions for the user device based on the speed category. Corresponding apparatus and network node are also disclosed.

20 Claims, 5 Drawing Sheets

(56) References Cited

U.S. PATENT DOCUMENTS

| | | | |
|---|---|---|---|
| 2012/0275387 A1* | 11/2012 | Xing | H04L 1/0643 370/328 |
| 2014/0315546 A1* | 10/2014 | Chen | H04W 52/0225 455/434 |
| 2014/0323144 A1 | 10/2014 | Kim et al. | |
| 2015/0230263 A1 | 8/2015 | Roy et al. | |
| 2016/0044462 A1* | 2/2016 | Li | H04W 64/003 455/456.3 |
| 2016/0353327 A1 | 12/2016 | Larsson et al. | |
| 2018/0212651 A1 | 7/2018 | Li et al. | |
| 2018/0262918 A1 | 9/2018 | Zhao et al. | |
| 2018/0352526 A1 | 12/2018 | Frenger et al. | |
| 2019/0158162 A1 | 5/2019 | Ryu et al. | |
| 2019/0199419 A1 | 6/2019 | Teslenko et al. | |
| 2019/0222364 A1* | 7/2019 | Shimoda | H04W 74/0833 |
| 2019/0277957 A1* | 9/2019 | Chandrasekhar | G01S 1/38 |
| 2020/0252118 A1* | 8/2020 | Zhang | H04B 7/0617 |

FOREIGN PATENT DOCUMENTS

| | | | |
|---|---|---|---|
| EP | 3547575 A1 | 10/2019 | |
| KR | 20160143509 A | 12/2016 | |
| WO | 2013125993 A1 | 8/2013 | |
| WO | 2017140374 A1 | 8/2017 | |
| WO | WO-2017167918 A1 * | 10/2017 | H04B 17/336 |
| WO | 2018054498 A1 | 3/2018 | |
| WO | WO-2018072842 A1 * | 4/2018 | H04W 56/0035 |
| WO | WO-2018084787 A1 * | 5/2018 | H04B 17/336 |
| WO | 2018105069 A1 | 6/2018 | |
| WO | 2018125686 A2 | 7/2018 | |
| WO | 2018171860 A1 | 9/2018 | |
| WO | 2018228519 A1 | 12/2018 | |

OTHER PUBLICATIONS

Examination Report for Indian Patent Application No. 202147055600, dated Jun. 6, 2022, 7 pages.

International Search Report and Written Opinion for International Patent Application No. PCT/EP2019/064569, dated Jan. 8, 2020, 9 pages.

International Search Report and Written Opinion for International Patent Application No. PCT/EP2019/064567, dated Mar. 6, 2020, 14 pages.

International Search Report and Written Opinion for International Patent Application No. PCT/EP2019/064564, dated Mar. 6, 2020, 21 pages.

Non-Final Office Action for U.S. Appl. No. 17/614,741, dated Oct. 26, 2023, 7 pages.

* cited by examiner

US 11,949,472 B2

MU-MIMO OPERATION CONTROL

This application is a 35 U.S.C. § 371 national phase filing of International Application No. PCT/EP2019/064564, filed Jun. 5, 2019, the disclosure of which is incorporated herein by reference in its entirety.

TECHNICAL FIELD

The present disclosure relates generally to the field of wireless communication. More particularly, it relates to control of multi-user multiple-input multiple-output (MU-MIMO) operation in wireless communication.

BACKGROUND

The concept of multi-user multiple-input multiple-output (MU-MIMO) operation in wireless communication is well known and may provide increased system throughput compared to other approaches.

Typically reference signaling are used to determine how an access node serving a plurality of user devices may apply MU-MIMO in relation to the plurality of user devices. Examples of reference signaling include sounding reference signals (SRS) transmitted from user devices and channel state information reference signals (CSI-RS) transmitted from the access node.

The reference signaling requires communication resources which typically cannot be used for conveying other types of signaling (e.g., data, control, etc.). Thus, reference signaling contributes to signaling overhead.

Furthermore, the determination of how the access node may apply MU-MIMO in relation to the plurality of user devices is typically computationally heavy, thereby contributing to high power consumption and/or strict requirements for computational resources.

Therefore, there is a need for approaches to control MU-MIMO operation. Preferably, such approaches provide one or more of: improved (e.g., decreased) signaling overhead, improved (e.g., decreased) computational complexity, and acceptable (e.g., maintained, or substantially maintained) system performance.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus or arrangement is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for multi-user multiple-input multiple-output (MU-MIMO) operation of an access node serving a plurality of user devices.

The method comprises acquiring a speed category for a user device of the plurality of user devices, and controlling the MU-MIMO operation in relation to the user device based on the speed category.

In some embodiments, controlling the MU-MIMO operation in relation to the user device based on the speed category comprises one or more of controlling reference signal transmission for the user device based on the speed category, and controlling MU-MIMO group affiliation of the user device based on the speed category.

In some embodiments, controlling reference signal transmission for the user device based on the speed category comprises controlling a duration of a time interval between subsequent reference signal transmissions for the user device based on the speed category, wherein the duration is from a set comprising at least a relatively long duration and a relatively short duration.

In some embodiments, controlling the duration comprises selecting the relatively long duration when the speed category of the user device is for stationary user devices.

In some embodiments, controlling the duration comprises selecting the relatively short duration when the speed category of the user device is neither for stationary devices nor for user devices having a speed of movement that exceeds a first speed threshold.

In some embodiments, controlling the duration comprises selecting the relatively long duration when the speed category of the user device is for user devices having a speed of movement that exceeds the first speed threshold.

In some embodiments, controlling reference signal transmission for the user device based on the speed category comprises disabling reference signal transmission when the speed category of the user device is for user devices having a speed of movement that exceeds the first speed threshold.

In some embodiments, the reference signal transmission is transmission of sounding reference signals (SRS) by the user device, and controlling reference signal transmission for the user device comprises transmitting, to the user device, a signal for configuring the user device for transmission of sounding reference signals based on the respective speed categorization.

In some embodiments, controlling MU-MIMO group affiliation of the user device based on the speed category comprises sorting the user device into one of a plurality of MU-MIMO groups when the speed category of the user device is for user devices having a speed of movement that does not exceed a second speed threshold.

In some embodiments, controlling MU-MIMO group affiliation of the user device based on the speed category comprises excluding the user device from all MU-MIMO groups when the speed category of the user device is for user devices having a speed of movement that exceeds the second speed threshold.

In some embodiments, MU-MIMO groups have an associated frequency of determining user orthogonality, wherein the frequency is from a set comprising at least a relatively low frequency of determining user orthogonality and a relatively high frequency of determining user orthogonality.

In some embodiments, controlling MU-MIMO group affiliation of the user device based on the speed category comprises sorting the user device into a MU-MIMO group associated with the relatively low frequency of determining user orthogonality when the speed category of the user device is for stationary user devices.

In some embodiments, controlling MU-MIMO group affiliation of the user device based on the speed category comprises sorting the user device into a MU-MIMO group for which determination of user orthogonality is disabled when the speed category of the user device is for stationary user devices.

In some embodiments, acquiring the speed category for the user device comprises determining the speed category based on respective maximum amplitude of a plurality of previous channel estimation samples for the user device.

In some embodiments, the speed category for the user device is determined to be for stationary user devices when spatial directions associated with the respective maximum amplitude of the plurality of previous channel estimation samples are substantially the same.

In some embodiments, the speed category for the user device is determined to be for user devices having a speed of movement that exceeds a third speed threshold when spatial directions associated with the respective maximum amplitude of the plurality of previous channel estimation samples have at least one mutual difference that exceeds an angle threshold.

In some embodiments, determining the speed category is performed using a speed determination machine learning algorithm trained on respective maximum amplitude of channel estimation samples for a set of user devices, wherein each user device is associated with a respective known speed.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for multi-user multiple-input multiple-output (MU-MIMO) operation of an access node serving a plurality of user devices.

The apparatus comprises controlling circuitry configured to cause acquisition of a speed category for a user device of the plurality of user devices, and control of the MU-MIMO operation in relation to the user device based on the speed category.

In some embodiments, the controlling circuitry is configured to cause control of the MU-MIMO operation in relation to the user device based on the speed category by causing one or more of control of reference signal transmission for the user device based on the speed category, and control of MU-MIMO group affiliation of the user device based on the speed category.

A fourth aspect is a network node comprising the apparatus of the third aspect.

In some embodiments, any of the above aspects may additionally have features identical with or corresponding to any of the various features as explained above for any of the other aspects.

An advantage of some embodiments is that alternative approaches to control MU-MIMO operation are provided.

An advantage of some embodiments is that improved (e.g., decreased) signaling overhead is provided for.

An advantage of some embodiments is that improved (e.g., decreased) computational complexity is provided for.

An advantage of some embodiments is that acceptable (e.g., maintained, or substantially maintained) system performance is provided for.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
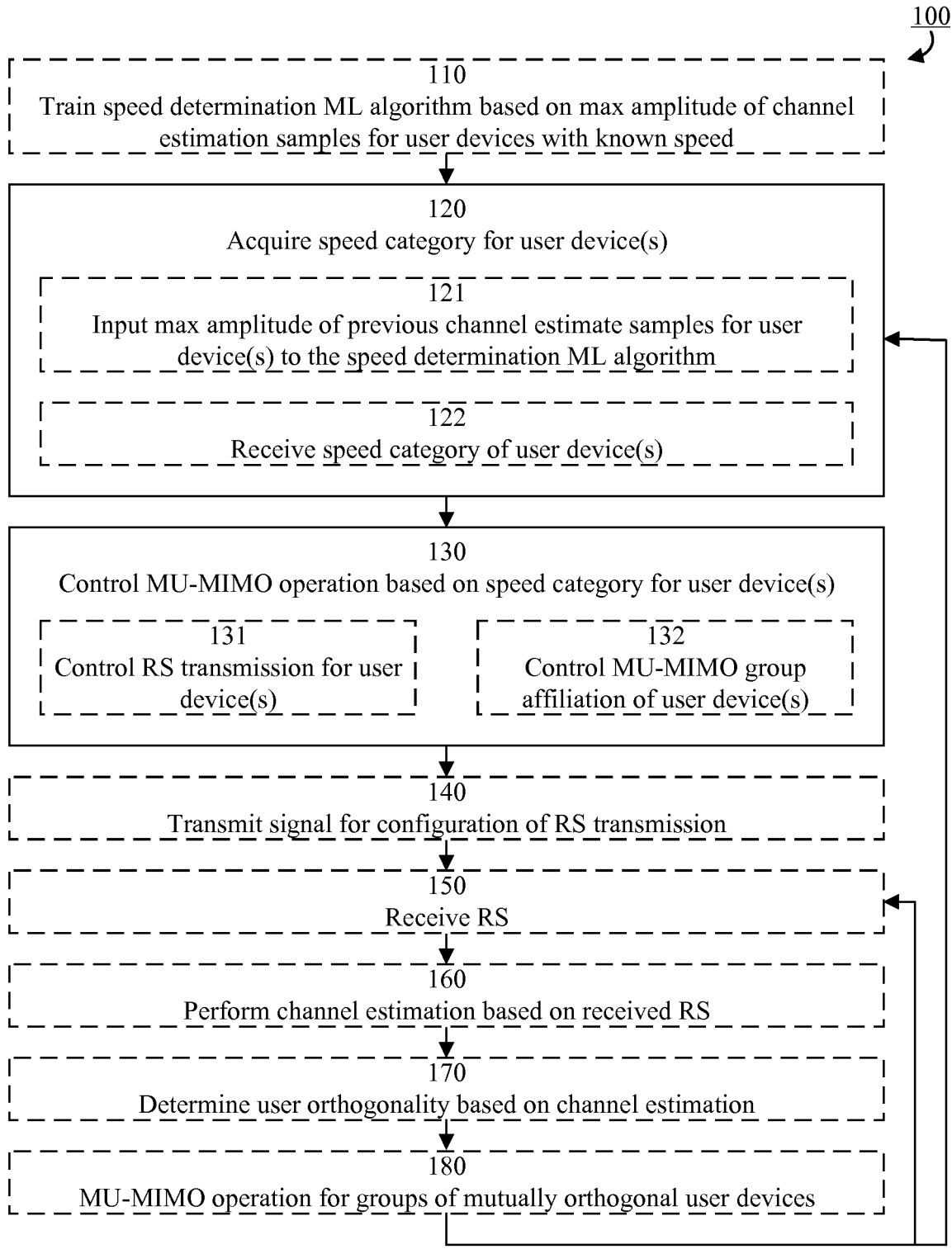
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It should be noted that, even though some examples are given herein in the terminology and context of Third Generation Partnership Project (3GPP) standards, embodiments may be equally applicable for other types of wireless communication networks.

In wireless communication networks, the mobile broadband use case has a continuously increasing demand for higher throughput. Increase of the throughput may be achieved by increasing the bandwidth or increasing the spectral efficiency (amount of information per time unit and per frequency unit). Bandwidth is typically a scarce resource so increasing the spectral efficiency may be an important aspect in providing higher throughput.

One way to increase the spectral efficiency is to use more antennas for both transmitter and receiver, enabling that multiple streams can be sent in parallel (e.g., from an access node to a user device); i.e., enabling multiple-input multiple-output (MIMO).

In single-user (SU) MIMO, the spectral efficiency is increased by the use of spatially separated radio signals, whereby a single user device is typically served by multiple parallel data streams using the same resource blocks. For SU-MIMO to work properly, both the transmitter (e.g., of the access node) and the receiver (e.g., of the user device) typically needs to have a number of antennas that is not less than the number of SU-MIMO streams transmitted by the transmitter and intended for the receiver.

In multi-user (MU) MIMO, the spectral efficiency may be increased even further by transmission of different streams to two or more different receiver devices. This is particularly applicable when the transmitter (e.g., an access node) has a relatively large number of antennas, while the receivers (e.g., user devices) each has a relatively low number of antennas. The number of parallel streams that can be properly communicated to a receiver is limited by the relatively low number of antennas of the receiver in this scenario, while the number of parallel streams that can be transmitted by the transmitter is limited by the relatively large number of antennas of the transmitter. Hence, the higher MIMO-capacity (i.e., the higher number of possible parallel streams) of the transmitter is used to transmit streams to several receivers according to MU-MIMO.

Beamforming may be achieved by using a phased antenna array, whereby narrow transmission beams can be formed in the directions of intended receivers (e.g., user devices), wherein each beam may be used to carry a MIMO stream towards the intended receiver. The intended receivers of beamformed MU-MIMO should be sufficiently spatially separated; preferably spatially orthogonal to each other. The level of spatial separation constrains the ability to minimize mutual interference between them. Hence, the transmitter typically needs to verify the orthogonality of co-scheduled receivers.

Generally, when determining user orthogonality is referred to herein, it may be taken to include such a process; verifying that the receivers are sufficiently spatially separated. Spatial separation may refer to spatial separation in terms of physical location of the receivers and/or to spatial separation in terms of radio propagation paths.

One approach to enable beamformed MU-MIMO is transmission of reference signals for measurements, whereby beamforming for the receivers can be determined, as well as orthogonality between receivers which may be used to select receivers for co-scheduling.

One example of reference signalling comprises sounding reference signals (SRS) transmitted in the uplink by a user device (e.g., a user equipment, UE) to enable the access node (e.g., a base station) to estimate uplink channel conditions, possibly for different frequencies.

The channel condition estimations may be used by a physical resource scheduler in the access node to assign communication resources (e.g., time/frequency resources, such as resource blocks) to uplink communication (e.g., on physical uplink shared channel, PUSCH) to achieve high uplink data rate while meeting the requirements of uplink multi-antenna transmission.

Alternatively or additionally, uplink channel estimation based on SRS may be used for downlink beamforming. The multiple antennas of the access node receive the SRS in respective (different) angles and at respective (different) signal strength. This information may be used to determine downlink beamforming for the user device that transmitted the SRS. This approach is particularly applicable if there is channel reciprocity between uplink and downlink (e.g., for time division duplex, TDD).

Another example of reference signalling comprises channel state information reference signals (CSI-RS) transmitted in the downlink by an access node to enable the user device to perform measurements for downlink channel conditions and report an indication of the measurement result to the access node. This information may be used to determine downlink beamforming for the user device that performed the measurements on the CSI-RS. This approach is particularly applicable if there is no channel reciprocity between uplink and downlink (e.g., for frequency division duplex, FDD).

As mentioned earlier, reference signaling requires communication resources which typically cannot be used for conveying other types of signaling, and determining user orthogonality is typically computationally heavy.

In the following, embodiments will be described where approaches to control MU-MIMO operation are provided. According to some embodiments, the approaches provide one or more of: improved signaling overhead, improved computational complexity, and acceptable system performance.

FIG. 1 illustrates an example method 100 according to some embodiments. The method 100 is for multi-user multiple-input multiple-output (MU-MIMO) operation of an access node serving a plurality of user devices. The method may be performed by the access node, or one or more of the steps of method 100 may be performed by another network node (e.g., a control node). Furthermore, the method 100 may be performed entirely at one node or may be distributed performed by two or more nodes.

In step 120, a speed category for a user device of the plurality of user devices is acquired. Typically, respective speed categories are acquired for each of several user devices (e.g., for all user devices of the plurality of user devices, or for a subset thereof).

A speed category for a user device is associated with a speed of movement of the user device. The speed category may typically be selected from a plurality of available speed categories.

When there are two available speed categories, they may relate to stationary user devices and non-stationary user devices, respectively.

Alternatively or additionally, when there are two available speed categories, they may relate to speeds of movement that fall below a speed threshold (e.g., a first, second, third or fourth speed threshold) and to speeds of movement that fall on or above the speed threshold, respectively.

When there are three available speed categories, they may relate to stationary user devices, non-stationary user devices with speeds of movement that fall below a speed threshold (e.g., a first, second, or third speed threshold), and non-stationary user devices with speeds of movement that fall on or above the speed threshold, respectively.

Alternatively or additionally, when there are three available speed categories, they may relate to speeds of movement that fall below a speed threshold (e.g., a fourth speed threshold)—low speed user devices, to speeds of movement that fall on or above the speed threshold but below another, higher valued, speed threshold (e.g., a first, second, or third speed threshold)—medium speed user devices, and to speeds of movement that fall on or above the higher valued speed threshold—high speed user devices, respectively.

It should be noted that the number of speed categories may have any suitable value (not limited by the examples two and three above). For example, there may be a virtually infinite number of continuous speed categories, corresponding to that step 120 comprises acquiring a speed estimate for a user device of the plurality of user devices.

Acquiring the speed category may comprise receiving a signal indicative of the speed category (as illustrated by optional sub-step 122) or estimating the speed category. Estimation of the speed category may be achieved in any suitable way. For example, an increasing or decreasing reference signal received power (RSRP) may indicate that the user device is non-stationary. According to some embodiments, estimation of the speed category is achieved using a machine learning algorithm as will be elaborated on later herein.

In step 130, the MU-MIMO operation of the access node is controlled in relation to the user device and based on the speed category acquired in step 120.

Controlling the MU-MIMO operation in relation to the user device based on the speed category may comprise controlling reference signal transmission for the user device based on the speed category (as illustrated by optional sub-step 131), and/or controlling MU-MIMO group affiliation of the user device based on the speed category (as illustrated by optional sub-step 132).

The reference signal transmission may comprise transmission of sounding reference signals (SRS) by the user device and/or transmission of channel state information reference signals (CSI-RS) by the access node.

In the case of SRS (or other reference signals to be transmitted from the user device and controlled by the method), the method typically comprises transmitting a signal for configuring for configuring the user device for transmission of the reference signals according to the control of step 130 (as illustrated by optional step 140), receiving the reference signals (as illustrated in optional step 150), performing channel estimation based on the received reference signals (as illustrated in optional step 160), determining user orthogonality based on the channel estimation and according to the control of step 130 (as illustrated in optional step 170), and performing MU-MIMO operation—i.e., transmit MU-MIMO signals—accordingly (as illustrated in optional step 180).

In the case of CSI-RS (or other reference signals to be transmitted from the access node and controlled by the method), the method typically comprises transmitting reference signals according to the control of step 130, receiving an indication (e.g., a CSI report) of channel estimation measurements performed by the user device on the reference signals, determining user orthogonality based on the indication of channel estimation measurements and according to the control of step 130, and performing MU-MIMO operation—i.e., transmit MU-MIMO signals—accordingly.

As illustrated by the loopback to step 120 in FIG. 1, the speed categorization of step 120 and the corresponding control of step 130 may be updated repeatedly, e.g., at regular time intervals and/or triggered by an event.

The loopback to step 150 in FIG. 1 is meant to illustrate that the updating of the speed categorization is typically, but not necessarily, less frequent than the reference signal transmissions.

Controlling reference signal transmission for the user device based on the speed category (optional sub-step 131) may comprise controlling a duration of a time interval between subsequent reference signal transmissions for the user device based on the speed category. The duration is from a set comprising at least a relatively long duration and a relatively short duration.

Alternatively or additionally, controlling reference signal transmission for the user device based on the speed category (optional sub-step 131) may comprise controlling a frequency (or periodicity) of reference signal transmissions for the user device based on the speed category. The frequency is typically related to (e.g., equal to, or proportional to) an inverse of duration of a time interval between subsequent reference signal transmissions for the user device. The frequency is from a set comprising at least a relatively low frequency and a relatively high frequency.

For example, controlling the duration may comprise selecting the relatively long duration (and/or the relatively low frequency) when the speed category of the user device is for stationary user devices. Thus, for such user devices, the reference signals are transmitted relatively seldom.

Generally, when it is referred to herein that a set comprises a relatively long duration and a relatively short duration, this is meant to be interpreted as the set comprising at least a first duration and a second duration, wherein—if the first duration corresponds to the relatively long duration and the second duration corresponds to the relatively short duration—the first duration is longer than the second duration.

Generally, when it is referred to herein that a set comprises at least a relatively low frequency and a relatively high frequency, this is meant to be interpreted as the set comprising at least a first frequency and a second frequency, wherein—if the first frequency corresponds to the relatively low frequency and the second frequency corresponds to the relatively high frequency—the first frequency is lower than the second frequency.

Generally, a speed category that is for stationary user devices may refer to a speed category for only stationary user devices, or to a speed category for stationary user devices and non-stationary user devices (e.g., with speeds of movement that fall below a speed threshold; e.g., a first, second, third or fourth speed threshold—relatively low speed user devices).

Furthermore, controlling the duration may comprise selecting the relatively short duration (and/or the relatively high frequency) when the speed category of the user device is not for stationary devices. Thus, for such user devices, the reference signals are transmitted relatively often.

Alternatively or additionally, controlling the duration may comprise selecting the relatively short duration (and/or the relatively high frequency) when the speed category of the user device is neither for stationary devices nor for user devices having a speed of movement that exceeds a first speed threshold. Thus, for such user devices, the reference signals are transmitted relatively often. Generally, a speed category that is neither for stationary user devices nor for user devices having a speed of movement that exceeds a first speed threshold may refer to a speed category for all non-stationary user devices having a speed of movement that does not exceed the first speed threshold, or to user devices having a speed of movement that does not exceed the first speed threshold but does exceed another, lower valued, speed threshold (e.g., a fourth speed threshold).

Furthermore, controlling the duration may comprise selecting the relatively long duration (and/or the relatively low frequency) when the speed category of the user device is for user devices having a speed of movement that exceeds the first speed threshold. Thus, for such user devices, the reference signals are transmitted relatively seldom.

Alternatively, controlling reference signal transmission for the user device based on the speed category may comprise disabling reference signal transmission when the speed category of the user device is for user devices having a speed of movement that exceeds the first speed threshold.

Controlling MU-MIMO group affiliation of the user device based on the speed category (optional sub-step 132) may comprise determining whether the user device is to belong to any MU-MIMO group at all, and/or selecting a type of MU-MIMO group for the user device to belong to (e.g., stationary/non-stationary, low/medium/high speed, etc.), and/or selecting—from several MU-MIMO groups of the same type—which MU-MIMO group the user device is to belong to.

For example, controlling MU-MIMO group affiliation of the user device based on the speed category may comprise sorting the user device into one of a plurality of MU-MIMO groups when the speed category of the user device is for user devices having a speed of movement that does not exceed a second speed threshold. Thus, such user devices are considered for MU-MIMO and the user orthogonality is not determined at all.

Furthermore, controlling MU-MIMO group affiliation of the user device based on the speed category may comprise excluding the user device from all MU-MIMO groups when the speed category of the user device is for user devices having a speed of movement that exceeds the second speed threshold. Thus, such user devices are not considered for MU-MIMO at all (but may be considered for SU-MIMO).

In some embodiments, MU-MIMO groups have an associated frequency (or periodicity) of determining user orthogonality. Typically, each type of MU-MIMO group has a corresponding frequency of determining user orthogonality. The frequency is from a set comprising at least a relatively low frequency of determining user orthogonality and a relatively high frequency of determining user orthogonality.

For example, controlling MU-MIMO group affiliation of the user device based on the speed category may comprise sorting the user device into a MU-MIMO group associated with the relatively low frequency of determining user orthogonality when the speed category of the user device is for stationary user devices. Thus, for such user devices, the user orthogonality is determined relatively seldom.

Alternatively, controlling MU-MIMO group affiliation of the user device based on the speed category may comprise sorting the user device into a MU-MIMO group for which determination of user orthogonality is disabled when the speed category of the user device is for stationary user devices. Thus, for such user devices, the user orthogonality is not determined at all.

Furthermore, controlling MU-MIMO group affiliation of the user device based on the speed category may comprise sorting the user device into a MU-MIMO group associated with the relatively high frequency of determining user orthogonality when the speed category of the user device is not for stationary devices. Thus, for such user devices, the user orthogonality is determined relatively often.

Alternatively or additionally, controlling MU-MIMO group affiliation of the user device based on the speed category may comprise sorting the user device into a MU-MIMO group associated with the relatively high frequency of determining user orthogonality when the speed category of the user device is neither for stationary devices nor for user devices having a speed of movement that exceeds the second speed threshold. Thus, for such user devices, the user orthogonality is determined relatively often.

Generally, the first and second speed thresholds may have different values, or may have the same value; the third speed threshold may have a different value than the first and/or second speed threshold, or may have the same value as the first and/or second speed threshold; and the fourth speed threshold may have a different value than the first and/or second and/or third speed threshold, or may have the same value as the first and/or second and/or third speed threshold. Typically, the first, second and third speed thresholds have the same value, and the fourth speed threshold has another, lower, value. For example, one or more of the first, second and third speed thresholds may have a value that corresponds to 30 kmph.

A few examples of controlling reference signal transmission (reference signal, RS, frequency) for the user device and MU-MIMO group affiliation (frequency of user orthogonality determination, OD) of the user device based on the speed category are illustrated in the tables below.

In Table 1, discrimination between categories B1 and C1 may be via the first and/or second speed threshold.

TABLE 1

| Speed cat. | Speed category description | RS frequency | OD frequency |
|---|---|---|---|
| A1 | Stationary | Low | Low or none |
| B1 | Non-stationary, low speed | High | High |
| C1 | Non-stationary, high speed | Low or none | None (excl. from MU-MIMO) |

In table 2, discrimination between categories A2 and B2 may be via the fourth speed threshold, and discrimination between categories B2 and C2 may be via the first and/or second speed threshold.

TABLE 2

| Speed cat. | Speed category description | RS frequency | OD frequency |
|---|---|---|---|
| A2 | Stationary or low speed | Low | Low or none |
| B2 | Medium speed | High | High |
| C2 | High speed | Low or none | None (excl. from MU-MIMO) |

TABLE 3

| Speed cat. | Speed category description | RS frequency | OD frequency |
|---|---|---|---|
| A3 | Stationary | Low | Low or none |
| B3 | Non-stationary | High | High |

In table 4, discrimination between categories A4 and B4 may be via the fourth speed threshold.

TABLE 4

| Speed cat. | Speed category description | RS frequency | OD frequency |
|---|---|---|---|
| A4 | Low speed | Low | Low or none |
| B4 | Medium to high speed | High | High |

In table 5, discrimination between categories A4 and B4 may be via the fourth speed threshold.

TABLE 5

| Speed cat. | Speed category description | RS frequency | OD frequency |
|---|---|---|---|
| A5 | Low to medium speed | High | High |
| B5 | High speed | Low | None (excl. from MU-MIMO) |

Acquiring the speed category (step 120) for the user device may comprise determining the speed category based on respective maximum amplitude of a plurality of previous channel estimation samples for the user device.

For example, the speed category for the user device may be determined to be for stationary user devices when spatial directions associated with the respective maximum amplitude of the plurality of previous channel estimation samples are substantially the same. Thus, it may be concluded that the user device is stationary if the spatial direction of the maximum amplitude does not vary.

Alternatively or additionally, the speed category for the user device may be determined to be for user devices having a speed of movement that exceeds a third speed threshold when spatial directions associated with the respective maximum amplitude of the plurality of previous channel estimation samples have at least one mutual difference that exceeds a (second) angle threshold. Thus, it may be concluded that the user device has high speed if the spatial direction of the maximum amplitude has large variations.

Alternatively or additionally, the speed category for the user device may be determined to be for user devices having a speed of movement that does not exceed a third speed threshold when spatial directions associated with the respective maximum amplitude of the plurality of previous channel estimation samples have no mutual difference that exceeds the (second) angle threshold. Thus, it may be concluded that the user device has low to medium speed if the spatial direction of the maximum amplitude has low to medium variations.

Alternatively or additionally, the speed category for the user device may be determined to be for user devices having a speed of movement that does not exceed a speed threshold (e.g., the fourth speed threshold) when spatial directions associated with the respective maximum amplitude of the plurality of previous channel estimation samples have no mutual differences that exceed a (first) angle threshold. Thus, it may be concluded that the user device has low speed if the spatial direction of the maximum amplitude does not vary or has very minor variations.

Alternatively or additionally, the speed category for the user device may be determined to be for user devices having a speed of movement that exceeds a speed threshold (e.g., the fourth speed threshold) but does not exceed a third speed threshold when spatial directions associated with the respective maximum amplitude of the plurality of previous channel estimation samples have at least one mutual difference that exceeds the (first) angle threshold, but have no mutual difference that exceeds the (second) angle threshold. Thus, it may be concluded that the user device has medium speed if the spatial direction of the maximum amplitude has medium variations.

In some embodiments, estimation of the speed category (step 120) is achieved using a speed determination machine learning (ML) algorithm.

In such embodiments, the method may comprise training the algorithm on respective maximum amplitude of channel estimation samples for a set of user devices, wherein each user device is associated with a respective known speed (as illustrated in optional step 110).

Then, step 120 may comprise estimating the speed category of a user device by inputting the maximum amplitude of previous channel estimate samples for the user device to the speed determination machine learning algorithm (as illustrated in optional sub-step 121).

Figure 2:
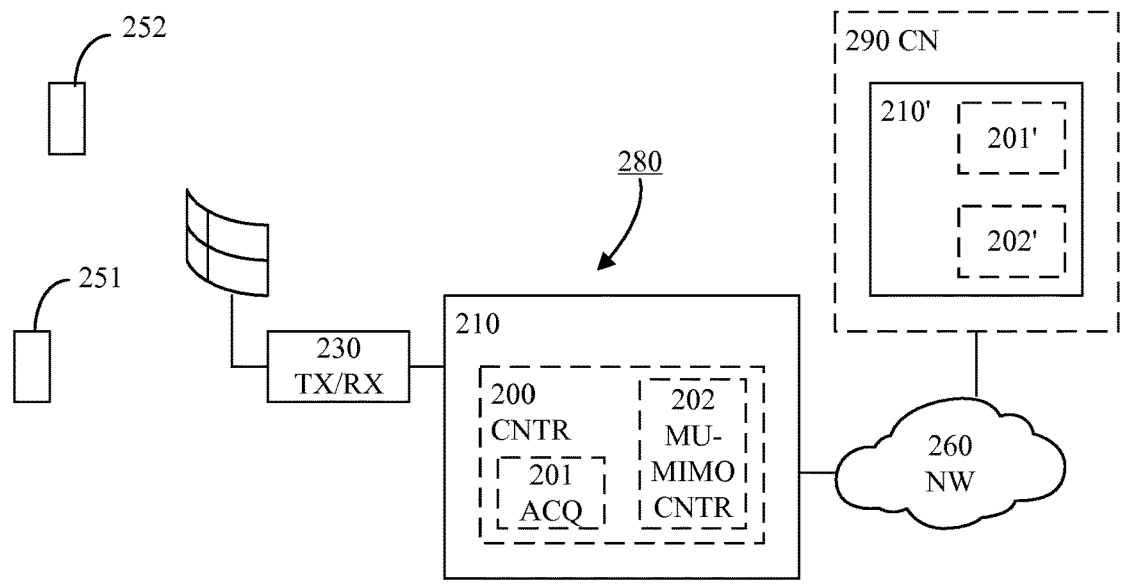
FIG. 2 is a schematic block diagram illustrating an example apparatus for a communication system according to some embodiments.

FIG. 2 schematically illustrates an example apparatus 210, 210' for a communication system according to some embodiments. The apparatus 210, 210' is for multi-user multiple-input multiple-output (MU-MIMO) operation of an access node 280 (e.g., a base station, such as a next generation NodeB, eNB) serving a plurality of user devices 251, 252 (e.g., user equipments, UEs). The apparatus may be comprisable (e.g., comprised) in the access node 280, or one or more in another network node (e.g., a control node, CN, 290), to with which the access node 280 is operationally connectable (e.g., via the network, NW, 260). Furthermore, the apparatus 210, 210' may be configured to cause performance of (e.g., perform) one or more of the method steps as illustrated in FIG. 1 or otherwise described herein.

The apparatus 210, 210' comprises a controller (CNTR; e.g., controlling circuitry or a control module) 200, 200'.

The controller is configured to cause acquisition of a speed category for a user device of the plurality of user devices (compare with step 120 of FIG. 1), and control of the MU-MIMO operation in relation to the user device based on the speed category (compare with step 130 of FIG. 1).

The controller may comprise, or be otherwise associated with, an acquirer (ACQ; e.g., acquiring circuitry or an acquisition module) 201, 201', which may be configured to acquire the speed category for the user device.

Additionally or alternatively, the controller may comprise, or be otherwise associated with, a MU-MIMO controller (MU-MIMO CNTR; e.g., MU-MIMO control circuitry or a MU-MIMO control module) 202, 202', which may be configured to control the MU-MIMO operation in relation to the user device based on the speed category.

Additionally or alternatively, the controller may comprise, or be otherwise associated with, a transceiver (TX/RX; e.g., transceiving circuitry or a transceiver module) 230, which may be configured to receive a signal indicative of the speed category (compare with sub-step 122 of FIG. 1). The transceiver 230 may, additionally or alternatively, be configured to transmit signal configuration (compare with step 140 of FIG. 1), receive reference signals (compare with step 150 of FIG. 1), and transmit MU-MIMO signals (compare with step 180 of FIG. 1).

Figure 3:
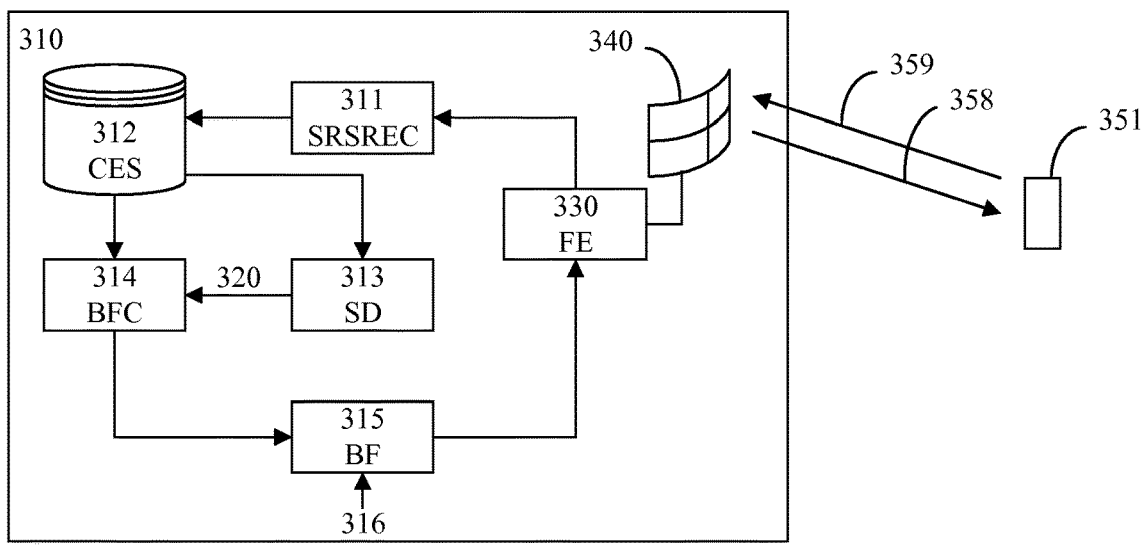
FIG. 3 is a schematic block diagram illustrating an example apparatus according to some embodiments.

FIG. 3 schematically illustrates an example apparatus 310 according to some embodiments. The example apparatus may be seen as an example functional and/or physical implementation of the controller 200 of FIG. 2.

A user device 351 transmits SRS 359 to the access node which receives the SRS via an antenna array 340 and corresponding front end circuitry (FE) 330. The SRS is used by the SRS receiver (SRSREC) 311 to estimate the channel over which the SRS was transmitted. The channel estimates are stored in channel estimation storage (CES) 312.

Channel estimates from the storage 312 are input to a speed determiner (SD) 313, which outputs a speed categorization 320 of the user device 351. The speed determiner 313 may be seen as an implementation of the acquirer 201, 201' of FIG. 2 and/or may be configured to perform step 120 of FIG. 1. For example, the speed determiner may comprise a speed determination machine learning algorithm.

The speed categorization is input together with channel estimates from the storage 312 to a beam forming controller (BFC) 314. The beam forming controller 314 controls beamforming (BF) 315 for downlink user data 316, which is then transmitted to the user device 351 via the front end circuitry 330 and the antenna array 340 as illustrated by 358.

The beam forming controller 314 may be seen as an implementation of the MU-MIMO controller 202, 202' of FIG. 2 and/or may be configured to perform step 130 of FIG. 1. For example, the beam forming controller may be configured to control reference signal transmission and/or MU-MIMO group affiliation for the user device based on the speed category.

According to some embodiments, an approach to control of MU-MIMO operation is provided to improve optimize advanced antenna systems (AAS) by using speed determination to categorize user devices into different speed categories, and use the speed categorization in beamforming control to improve (e.g., reduce) SRS resource usage as well as the computational complexity.

In typical prior art scenarios, assessing user devices for beam forming (determining user orthogonality) is computationally costly. When user devices are to be considered for MU-MIMO, an orthogonality check typically needs to be performed for every scheduling occasion and for all user devices in the scheduling queue of a cell to sort the user devices into MU-MIMO groups, to avoid that non-orthogonal beamformed user devices scheduled at the same time generate substantial interference to each other. Embodiments presented herein may be particularly suitable for such scenarios.

For SRS signaling in 3GPP, cell specific SRS configuration in the time domain (e.g., a certain sub-frame number) may be broadcasted in System Information Block 2 (SIB2). Typically, all user devices in the cell shall transmit SRS in the, thus defined, sub-frame when SRS transmission is required. User (UE) specific SRS transmission may be configured via an radio resource control (RRC) message (e.g., RRC Connection Setup, or RRC Connection Reconfiguration).

There are two different UE specific SRS transmission types; periodic SRS transmission and aperiodic SRS transmission. Only one SRS transmission type is effective in a UE at time.

Periodic SRS transmission starts to be effective when the UE receives a UE specific SRS configuration in an RRC message. Then, UE keeps transmitting SRS at regular time intervals according to the SRS configuration. Periodic SRS transmission configuration can be removed only via an RRC message. One advantage of periodic SRS transmission is that there is no additional signaling except the RRC messages to enable and disable it. One drawback is that it is inflexible.

Aperiodic SRS transmission is configured via an RRC message. Aperiodic SRS transmission is triggered each time by a layer two (L2) downlink control information (DCI) message. The aperiodic SRS transmission configuration can remain in UE until a new configuration is needed. One advantage of aperiodic SRS transmission is that it is flexible and controlled by L2.

In typical prior art scenarios, sounding Reference Signal (SRS) is a finite resource in the cell and only a small number of user devices can have SRS activated at the same time. SRS transmission consumes physical uplink resources, which cannot be allocated for other purposes at the same time. Furthermore, SRS transmission generates uplink interference to the other user devices. To avoid SRS transmission collision, there may typically be only one user device allowed to transmit SRS at each time domain resource. To prevent that SRS transmissions overlaps uplink PUSCH transmissions of other user devices, all uplink PUSCH transmissions should typically avoid the time domain resources used for SRS transmission. Due to these restrictions, there may be constraints regarding the number of user devices configured in periodic SRS transmission type at the same time. Embodiments presented herein may be particularly suitable for such scenarios. When periodic SRS transmission type is used, layer three (L3) may be used to control SRS resource allocations (compare with sub-step 131 of FIG. 1) to different user devices according to some embodiments.

One approach of the speed determining machine learning algorithm will now be described in the context of the speed determiner 313 of FIG. 3.

For each received SRS 359 the access node decodes and transforms the received signal from antenna space into beam space in SRSREC 311. This data in beam space is referred to as channel estimations. These channel estimations are aggregated over time and stored in a database 312. The storage in 312 is defined as a first rolling window where only a defined number of samples are kept. As new channel estimations are added to the first rolling window, old ones are discarded. This set of aggregated channel estimations in 312 are available to the velocity predictor 313.

The speed determining machine learning algorithm 313 may utilize a neural network for machine learning to determine the speed category. The input of the neural network is the amplitude of the channel estimation as measured at a certain frequency. The amplitude of the channel estimation is extracted and calculated from the raw data in 312. Furthermore, in order to create more sample examples, the data in 312 is sampled by a second rolling window, wherein each window is a sample example, and the window size decides for how long the user device is classified as being non-stationary or stationary.

Supervised learning may be used for this neural network. Therefore, labeled data is generated for training purposes, wherein each label corresponds to the (known) speed of the user device, and wherein the number of sample examples with different labels are equal. The sample examples are randomly divided as follows: 70% of the sample examples to a training dataset, 15% of the sample examples to a cross validation dataset, and 15% of the sample examples to a test dataset. Thereafter, they are input to the neural network to train the model. The training dataset is used to update the weights of connections between neurons of the model. The validation dataset provides the unbiased evaluation of a fitted model; it will stop training when the error on validation set increase, which is sign of overfitting on training dataset. Overfitting occurs when a model produces relatively small error on training dataset but much larger error when new data input in the model.

Generally, the values of the channel estimation will change fast when a user device is moving with high speed, while the values of the channel estimation will change slowly when a user device is stationary or moving with low speed. To save power for measurements, the data is sampled by a relatively low sample frequency; is chosen to obtain an acceptable (e.g., the best) classification result. The structure of a neural network can be constructed to have a relatively high accuracy for both training datasets and new input datasets.

The speed category of a user device may be determined to be stationary or non-stationary by a binary neural network. Using a multiclass neural network, more speed categories may be used. For example, the speed category of a user device may be determined to be stationary, medium speed (including 30 kmph), or high speed (including 100 kmph) by a multiclass neural network.

For example, the structure of a binary neural network may be designed as follows. The input layer combines 50 input neurons, the hidden layer is composed of 10 neurons, and one neuron acts as output layer. The sigmoid (logistic) function is implemented as activation function. The data is sampled by sample rate 1/6, which means that (for one input neuron of neural network) one value of data is sampled for every 6 continuous data values. The sample examples for a user device in the training phase are labelled by 0 or 1 corresponding to stationary or non-stationary and are used as input for the neural network. The value of the output layer when used after training is typically either close to 0 or 1 corresponding to stationary or non-stationary.

For example, the structure of a multiclass neural network may be designed as follows. The number of neurons of the input layer, the hidden layer, and the output layer are 80, 10, and 3, respectively. The sample examples for a user device in the training phase are labelled by a 3-bit binary column vector, where one of the 3 bits is set to 1 and the rest to 0, corresponding to three speed categories (for example, stationary, 30 km/h, or 100 km/h). When training the multiclass model, three labelled datasets are sampled by same sample frequency as input of multiclass neural network. A value of ⅛ is chosen as the sample rate. The value of the output layer when used after training is typically close to a vector with one 1 and two 0, corresponding to one of the three speed categories.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 4:
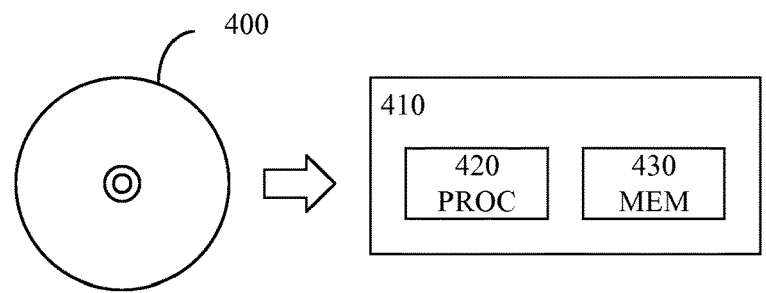
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit) 420, which may, for example, be comprised in a network node 410. When loaded into the data processor, the computer program may be stored in a memory (MEM) 430 associated with or comprised in the data-processing unit. According to some embodiments, the computer program may, when loaded into and run by the data processing unit, cause execution of method steps according to, for example, any of the methods illustrated in FIG. 1 or otherwise described herein.

Figure 5:
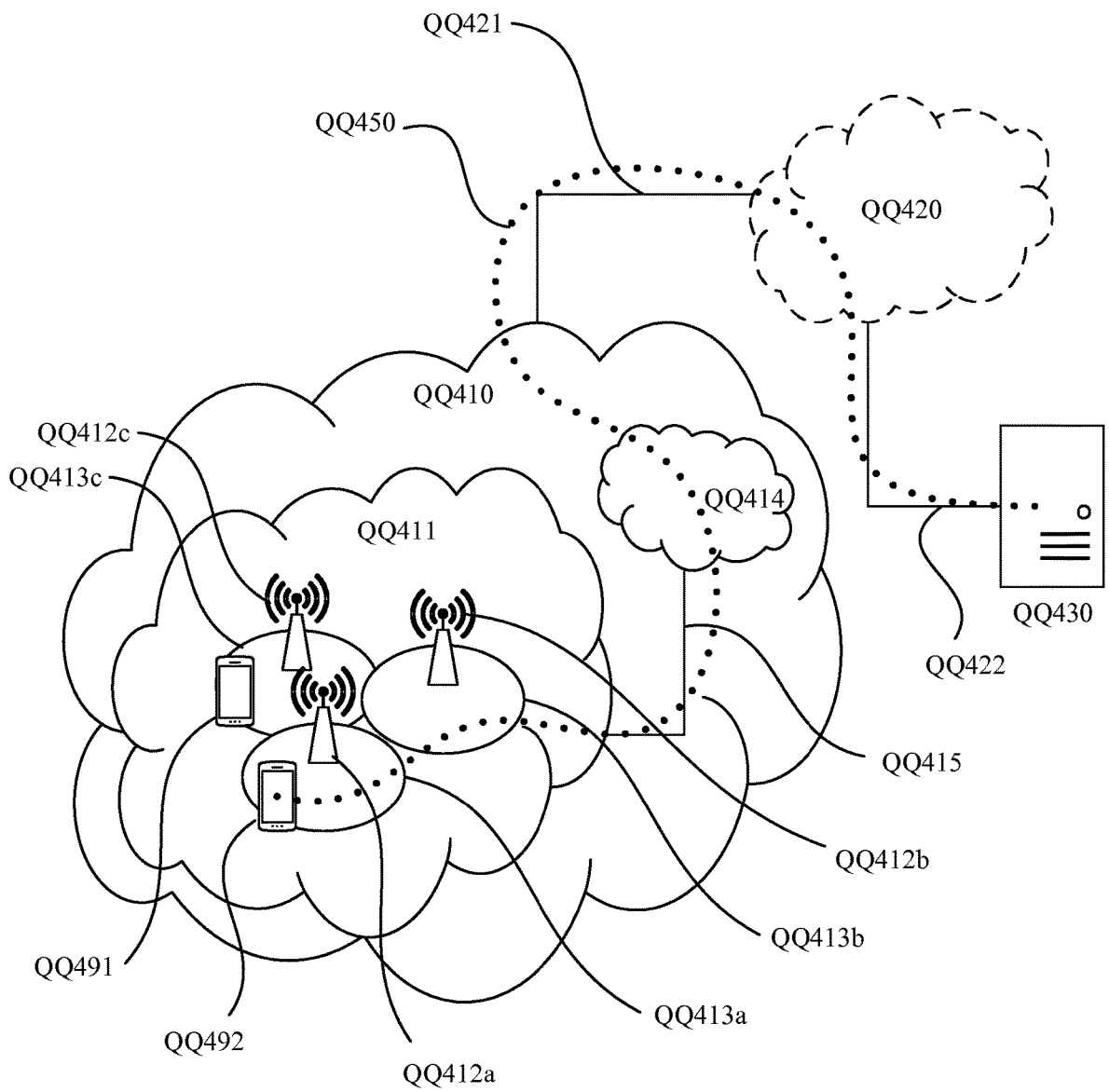
FIG. 5 illustrates a telecommunication network connected via an intermediate network to a host computer in accordance with some embodiments.

With reference to FIG. 5, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 5 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries.

OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 6. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 6) served by base station QQ520. Communication interface QQ526 may be configured to facilitate connection QQ560 to host computer QQ510. Connection QQ560 may be direct or it may pass through a core network (not shown in FIG. 6) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 6:
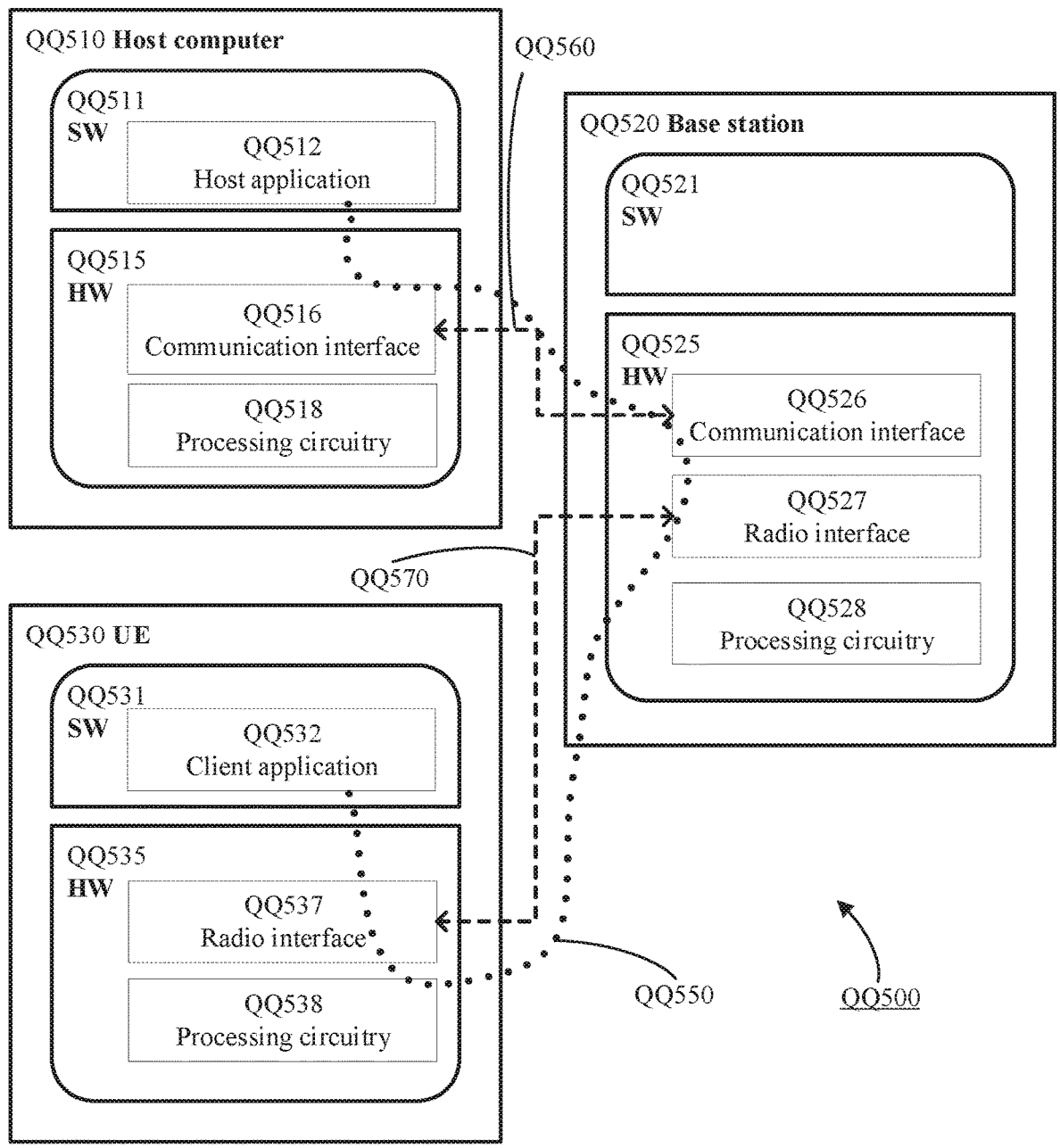
FIG. 6 illustrates a host computer communicating via a base station with a user equipment over a partially wireless connection in accordance with some embodiments.

It is noted that host computer QQ510, base station QQ520 and UE QQ530 illustrated in FIG. 6 may be similar or identical to host computer QQ430, one of base stations QQ412a, QQ412b, QQ412c and one of UEs QQ491, QQ492 of FIG. 5, respectively. This is to say, the inner workings of these entities may be as shown in FIG. 6 and independently, the surrounding network topology may be that of FIG. 5.

In FIG. 6, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the signaling overhead and/or the computational effort and thereby provide benefits such as improved throughput and/or power consumption.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 7:
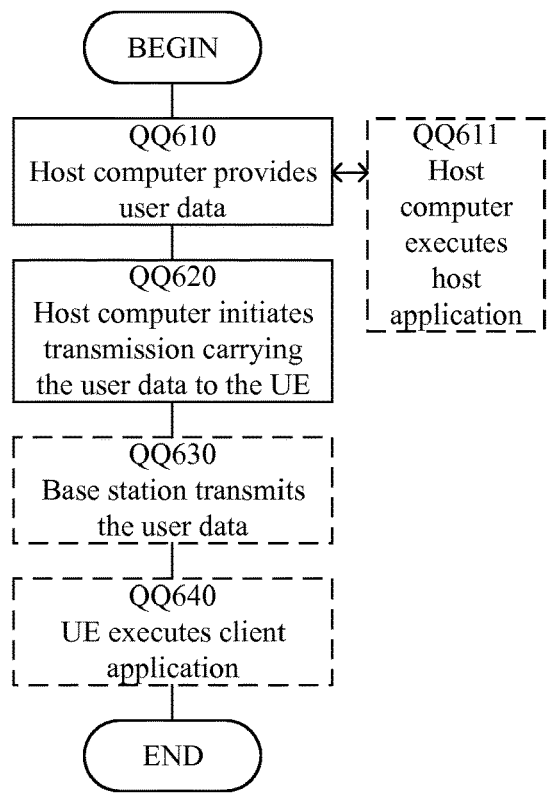
FIG. 7 is a flowchart illustrating example method steps implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 8:
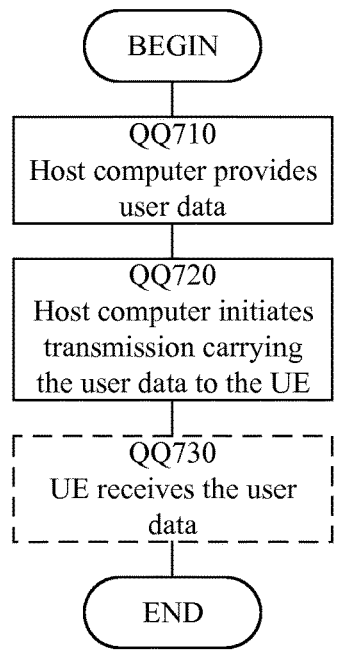
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 9:
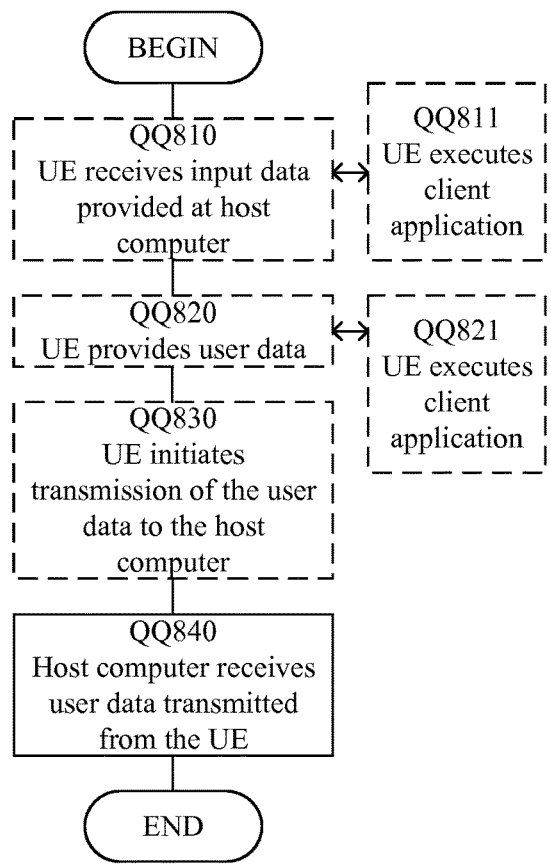
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 10:
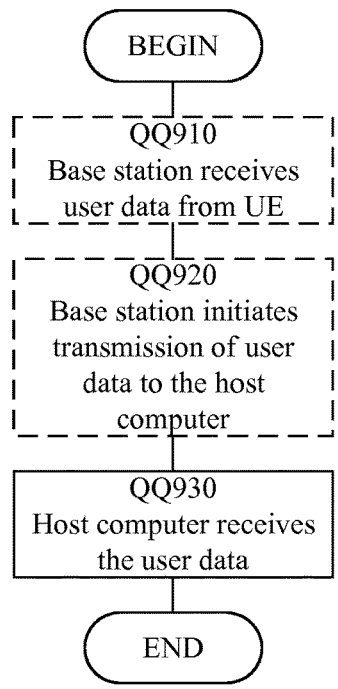
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a base station for multi-user multiple-input multiple-output—MU-MIMO— operation of an access node serving a plurality of user devices, the method comprising:
  acquiring a speed category for a user device of the plurality of user devices; and
  controlling the MU-MIMO operation in relation to the user device based on the speed category.

A2. The method of any of the previous embodiments in Group A, further comprising:
obtaining user data; and
forwarding the user data to a host computer or a wireless device.

Group B Embodiments

B1. A base station for multi-user multiple-input multiple-output—MU-MIMO—operation of an access node serving a plurality of user devices, the base station comprising:
processing circuitry configured to perform any of the steps of any of the Group A embodiments;
power supply circuitry configured to supply power to the base station.

Group C Embodiments

C1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group A embodiments.
C2. The communication system of embodiment C1 further including the base station.
C3. The communication system of any of embodiments C1 through C2, further including the UE, wherein the UE is configured to communicate with the base station.
C4. The communication system of any of embodiments C1 through C3, wherein:
the processing circuitry of the host computer is configured to execute a host application, thereby providing the user data; and
the UE comprises processing circuitry configured to execute a client application associated with the host application.
C5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group A embodiments.
C6. The method of embodiment C5, further comprising, at the base station, transmitting the user data.
C7. The method of any of embodiments C5 through C6, wherein the user data is provided at the host computer by executing a host application, the method further comprising, at the UE, executing a client application associated with the host application.
C8. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group A embodiments.
C9. The communication system of embodiment C8 further including the base station.
C10. The communication system of any of embodiments C8 through C9, further including the UE, wherein the UE is configured to communicate with the base station.
C11. The communication system of any of embodiments C8 through C10, wherein:
the processing circuitry of the host computer is configured to execute a host application;
the UE is configured to execute a client application associated with the host application, thereby providing the user data to be received by the host computer.
C12. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group A embodiments.
C13. The method of embodiment C12, further comprising at the base station, receiving the user data from the UE.
C14. The method of any of embodiments C12 through C13, further comprising at the base station, initiating a transmission of the received user data to the host computer.

The invention claimed is:
1. A method for multi-user multiple-input multiple-output (MU-MIMO) operation of an access node serving a plurality of user devices, the method comprising:
acquiring a speed category for a user device of the plurality of user devices; and
controlling the MU-MIMO operation in relation to the user device based on the speed category, wherein controlling the MU-MIMO operation based on the speed category further comprises:
controlling a frequency of determining user orthogonality relating to a spatial separation between at least one of co-scheduled receivers or radio propagation paths based on the speed category.
2. The method of claim 1, wherein controlling the MU-MIMO operation in relation to the user device based on the speed category comprises one or more of:
controlling reference signal transmission for the user device based on the speed category; and
controlling MU-MIMO group affiliation of the user device based on the speed category.
3. The method of claim 2, wherein controlling reference signal transmission for the user device based on the speed category comprises controlling a duration of a time interval between subsequent reference signal transmissions for the user device based on the speed category, wherein the duration is from a set comprising at least a relatively long duration and a relatively short duration.
4. The method of claim 3, wherein controlling the duration comprises selecting the relatively long duration when the speed category of the user device is for stationary user devices.
5. The method of claim 3, wherein controlling the duration comprises selecting the relatively short duration when the speed category of the user device is neither for stationary devices nor for user devices having a speed of movement that exceeds a first speed threshold.

6. The method of claim 5, wherein controlling the duration comprises selecting the relatively long duration when the speed category of the user device is for user devices having a speed of movement that exceeds the first speed threshold.

7. The method of claim 5, wherein controlling reference signal transmission for the user device based on the speed category comprises disabling reference signal transmission when the speed category of the user device is for user devices having a speed of movement that exceeds the first speed threshold.

8. The method of claim 2, wherein the reference signal transmission is transmission of sounding reference signals (SRS) by the user device, and wherein controlling reference signal transmission for the user device comprises transmitting, to the user device, a signal for configuring the user device for transmission of sounding reference signals based on the respective speed categorization.

9. The method of claim 2, wherein controlling MU-MIMO group affiliation of the user device based on the speed category comprises sorting the user device into one of a plurality of MU-MIMO groups when the speed category of the user device is for user devices having a speed of movement that does not exceed a second speed threshold.

10. The method of claim 9, wherein controlling MU-MIMO group affiliation of the user device based on the speed category comprises excluding the user device from all MU-MIMO groups when the speed category of the user device is for user devices having a speed of movement that exceeds the second speed threshold.

11. The method of claim 9, wherein the frequency of determining user orthogonality is from a set comprising at least a relatively low frequency of determining user orthogonality and a relatively high frequency of determining user orthogonality.

12. The method of claim 11, wherein controlling MU-MIMO group affiliation of the user device based on the speed category comprises sorting the user device into a MU-MIMO group associated with the relatively low frequency of determining user orthogonality when the speed category of the user device is for stationary user devices.

13. The method of claim 11, wherein controlling MU-MIMO group affiliation of the user device based on the speed category comprises sorting the user device into a MU-MIMO group for which determination of user orthogonality is disabled when the speed category of the user device is for stationary user devices.

14. The method of claim 1, wherein acquiring the speed category for the user device comprises determining the speed category based on respective maximum amplitude of a plurality of previous channel estimation samples for the user device.

15. The method of claim 14, wherein the speed category for the user device is determined to be for stationary user devices when spatial directions associated with the respective maximum amplitude of the plurality of previous channel estimation samples are substantially the same.

16. The method of claim 14, wherein the speed category for the user device is determined to be for user devices having a speed of movement that exceeds a third speed threshold when spatial directions associated with the respective maximum amplitude of the plurality of previous channel estimation samples have at least one mutual difference that exceeds an angle threshold.

17. The method of claim 14, wherein determining the speed category is performed using a speed determination machine learning algorithm trained on respective maximum amplitude of channel estimation samples for a set of user devices, wherein each user device is associated with a respective known speed.

18. An apparatus for multi-user multiple-input multiple-output (MU-MIMO) operation of an access node serving a plurality of user devices, the apparatus comprising controlling circuitry configured to cause:
acquisition of a speed category for a user device of the plurality of user devices; and
control of the MU-MIMO operation in relation to the user device based on the speed category, wherein the control of the MU-MIMO operation based on the speed category further comprises the controlling circuitry to:
control a frequency of determining user orthogonality relating to a spatial separation between at least one of co-scheduled receivers or radio propagation paths based on the speed category.

19. The apparatus of claim 18, wherein the controlling circuitry is configured to cause control of the MU-MIMO operation in relation to the user device based on the speed category by causing one or more of:
control of reference signal transmission for the user device based on the speed category; and
control of MU-MIMO group affiliation of the user device based on the speed category.

20. The apparatus of claim 19, wherein the controlling circuitry is configured to cause control of reference signal transmission for the user device based on the speed category by causing control of a duration of a time interval between subsequent reference signal transmissions for the user device based on the speed category, wherein the duration is from a set comprising at least a relatively long duration and a relatively short duration.

* * * * *